United States Patent
Ikeda (10) Patent No.: US 12,518,081 B2
(45) Date of Patent: Jan. 6, 2026

(54) INFORMATION PROCESSING APPARATUS, METHOD FOR CONTROLLING THE SAME, AND STORAGE MEDIUM

(71) Applicant: Canon Kabushiki Kaisha, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 18/457,501

(22) Filed: Aug. 29, 2023

(65) Prior Publication Data
US 2024/0078371 A1 Mar. 7, 2024

(30) Foreign Application Priority Data
Sep. 6, 2022 (JP) .................................. 2022-141514

(51) Int. Cl.
*G06F 3/048* (2013.01)
*G06F 40/109* (2020.01)

(52) U.S. Cl.
CPC .................................. *G06F 40/109* (2020.01)

(58) Field of Classification Search
CPC ....... G06F 40/109; G06F 3/0484; G06F 3/048
See application file for complete search history.

(56) References Cited

U.S. PATENT DOCUMENTS

| 8,395,806 | B2* | 3/2013 | Kusakabe | G06F 3/1285 |
| | | | | 358/1.18 |
| 10,949,603 | B2* | 3/2021 | Takahashi | G06F 40/109 |
| 11,227,198 | B2* | 1/2022 | Garces | G06K 15/1802 |
| 2008/0028307 | A1* | 1/2008 | Oh | G06F 40/106 |
| | | | | 715/274 |
| 2009/0310180 | A1* | 12/2009 | Uchida | H04N 1/00973 |
| | | | | 358/1.15 |
| 2011/0091134 | A1* | 4/2011 | Kamiya | H04N 1/00405 |
| | | | | 382/309 |
| 2012/0105322 | A1* | 5/2012 | Okano | G06F 3/04845 |
| | | | | 345/157 |
| 2015/0278658 | A1* | 10/2015 | Hara | G06V 30/245 |
| | | | | 358/1.9 |
| 2018/0376014 | A1* | 12/2018 | Nakai | H04N 1/00514 |
| 2022/0030138 | A1* | 1/2022 | Inoue | G06V 20/52 |

FOREIGN PATENT DOCUMENTS

| JP | 2018-014603 A | | 1/2018 |
| JP | 2022024629 A | * | 2/2022 |

\* cited by examiner

*Primary Examiner* — Linh K Pham
(74) *Attorney, Agent, or Firm* — Venable LLP (57) ABSTRACT

An information processing apparatus has a first drawing function and a second drawing function different from the first drawing function, draws a screen using the first drawing function and the second drawing function, acquires a setting of a character decoration used to draw a predetermined font by the second drawing function, and uses the acquired setting of the character decoration when drawing a character of the predetermined font using the first drawing function.

10 Claims, 9 Drawing Sheets

| LANGUAGE MODE | 1 | 2 |
|---|---|---|
| Japanese | FONT FILE A | FONT FILE B |
| English | FONT FILE B | FONT FILE A |

F I G. 5B

| LANGUAGE MODE | FONT FILE | CHARACTER SPACING (px) | CHARACTER WIDTH (TIMES) | CHARACTER SIZE ADJUSTMENT (px) |
|---|---|---|---|---|
| Japanese | A | 0 | 1 | 0 |
| Japanese | B | 3 | 0.8 | +4 |
| English | A | 0 | 1 | 0 |
| English | B | 4 | 0.8 | +2 |
| English | C | 0 | 1 | 0 |

| LANGUAGE MODE | FONT FILE | CHARACTER SPACING (px) | CHARACTER WIDTH (TIMES) | CHARACTER SIZE ADJUSTMENT (px) |
|---|---|---|---|---|
| Japanese | A | 0 | 1 | 0 |
| Japanese | B | 3 | 0.8 | +4 |
| English | A | 0 | 1 | 0 |
| English | B | 4 | 0.8 | +2 |
| English | C | 0 | 1 | 0 |

FIG. 9

INFORMATION PROCESSING APPARATUS, METHOD FOR CONTROLLING THE SAME, AND STORAGE MEDIUM

BACKGROUND OF THE INVENTION

Field of the Invention

The present invention relates to an information processing apparatus, a method for controlling the same, and a storage medium.

Description of the Related Art

An apparatus equipped with a Web browser (hereinafter referred to as a browser) and having a function of browsing a Web page on the browser is being widely used. There is also an application that uses a drawing result of a Web page by a browser function (hereinafter referred to as a browser region) as a part of a screen. An application utilizing a browser region is widely used in smartphones, multifunction peripherals, and the like.

Meanwhile, there is a mechanism called a Web font (hereinafter, referred to as a Web font) that uses an external font stored in an external server for drawing a Web page. The Web font is defined by the CSS Fonts Module Level 3 standard specification. CSS is an abbreviation of Cascading Style Sheets, and is a specification for specifying decoration of a Web page. The use of the Web font makes it possible to unify the appearance of characters in a Web page on any apparatus, and contributes to an improvement in the brand strength of a company that develops a Web page and a reduction in the number of Web page development man-hours. On the other hand, when the Web font is used in the browser region, the fonts are not unified between the browser region and the other region of the application screen since the external font is applied only in the browser region. In order to solve this problem, Japanese Patent Laid-Open No. 2018-014603 (hereinafter referred to as Patent Document 1) proposes a method in which an external font can also be used in a region other than a browser region in an application screen.

In Patent Document 1, when a web font is used by a browser function, an application of an apparatus is notified that an external font has been read. The application that has received the notification can unify the font of the entire screen by applying the external font to a region other than the browser region. However, the application of the apparatus draws the character in a form suitable for its use. Therefore, even if the same external font is used in the application and the browser function, there is a problem in that character decorations (character width, character size, character spacing, and the like) differ between the browser region and the other regions.

For example, an application (hereinafter referred to as a UI application) for displaying a user interface (hereinafter referred to as a UI) draws characters with character decoration suitable for the UI. The UI includes a UI component represented by a button, a pull-down menu, or the like, and it is necessary to prevent a drawing result of a character from protruding from a drawing region of the UI component. On the other hand, the browser function draws characters in a character decoration suitable for Web page browsing. The Web page is based on the premise that sentences are written in a large region, and paragraph intervals and line feed positions can be relatively freely adjusted. Therefore, it is important to use the character shape itself stored in the external font. As a result, the character decoration of the character in the region drawn by the UI application may be different from the character decoration of the character in the region drawn by the browser function. As described above, when the character decorations of the characters drawn by the different drawing functions are different from each other, there is a possibility that the design property and the visibility may deteriorate.

SUMMARY OF THE INVENTION

According to an aspect of the present invention, there is provided a technique for providing a sense of unity in character decoration of characters drawn by different drawing functions.

According to one aspect of the present invention, there is provided an information processing apparatus comprising: a drawing unit that has a first drawing function and a second drawing function different from the first drawing function, and draws a screen using the first drawing function and the second drawing function; and n acquisition unit configured to acquire a setting of a character decoration used to draw a predetermined font by the second drawing function, wherein the drawing unit uses the setting of the character decoration acquired by the acquisition unit when drawing a character of the predetermined font using the first drawing function.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example of an information processing apparatus that provides a UI screen including a region (browser region) in which a UI application is drawn by a browser function will be described below. The information processing apparatus according to the present embodiment holds setting information of character decorations (e.g., character width, character size, and character spacing) used by the UI application for each language mode and font file (character shape information) used. When the browser function draws the browser region, the held setting information of the character decoration is referred to. This makes it possible to obtain a sense of unity between the characters in the region (application region) drawn by the UI application and the characters in the browser region drawn by the browser function. In addition, when a UI is created using Web content, there are advantages such as the number of development man-hours can be reduced, customization is easy, and the like compared to a case where a UI is created without using Web content. For example, in a case where a UI is created using a development language that needs to be compiled, development man-hours for compiling and evaluating each product are required. On the other hand, in a case where a UI is created using a Web content, a single Web content can be used for various types of products, and thus development man-hours can be reduced. In addition, if the Web content displayed in the browser region is arranged in an external server, the display result of the browser region can be changed after product shipment, and customization according to the product type or the product version becomes easy.

In the present embodiment, a case where the UI application of the information processing apparatus generates a UI screen including a browser region will be described as an example. Furthermore, in the present embodiment, a multifunction peripheral is assumed as an information processing apparatus, and a home screen including a region in which a login button, a device setting button, an icon for selecting a function, and the like are arranged is illustrated as an example of a UI screen, but it is needless to say that the present disclosure is not limited thereto.

Figure 1:
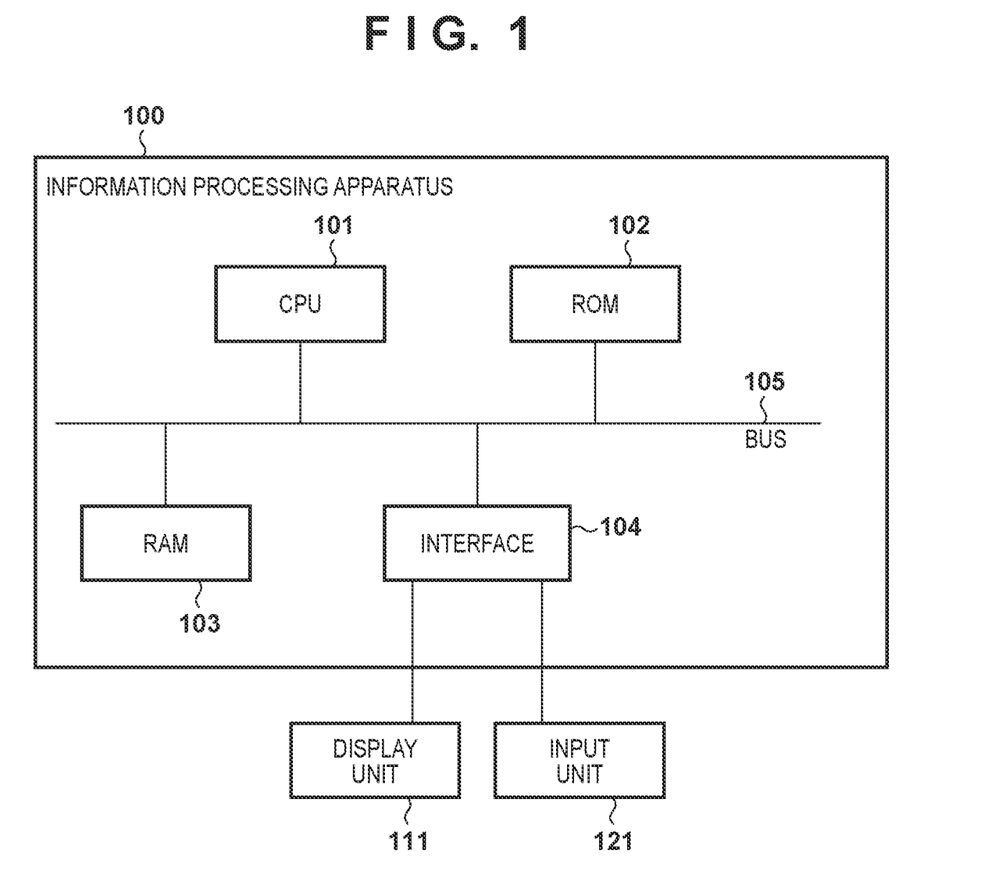
FIG. 1 is a block diagram illustrating an example of a hardware configuration of an information processing apparatus according to a first embodiment.

First, an exemplary hardware configuration of an information processing apparatus according to the present embodiment will be described with reference to the block diagram illustrated in FIG. 1. A CPU 101 is a Central Processing Unit (CPU) that controls an entire information processing apparatus 100. A ROM 102 is a Read Only Memory, and stores programs and parameters that do not need to be changed. A RAM 103 is a Random Access Memory, and temporarily stores programs and data provided from an external device or the like. An interface 104 connects a display unit 111 and an input unit 121 to a bus 105. The bus 105 communicatively connects the units described above. The display unit 111 displays data held by the information processing apparatus 100, a UI including a home screen described below, and the like under the control of the CPU 101. The input unit 121 includes, for example, a touch panel for accepting an operation from a user. Furthermore, the input unit 121 may include a pointing device such as a mouse and an input device such as a keyboard. The information processing apparatus 100 may also include a hard disk, a memory card, or the like. Alternatively, the information processing apparatus 100 may be detachable from an external storage device including an optical disk such as a flexible disk (FD) or a compact disk (CD), a magnetic card, an optical card, an IC card, a memory card, and the like. Furthermore, the information processing apparatus 100 may include a network interface or the like for connecting to a network line such as the Internet.

Figure 2:
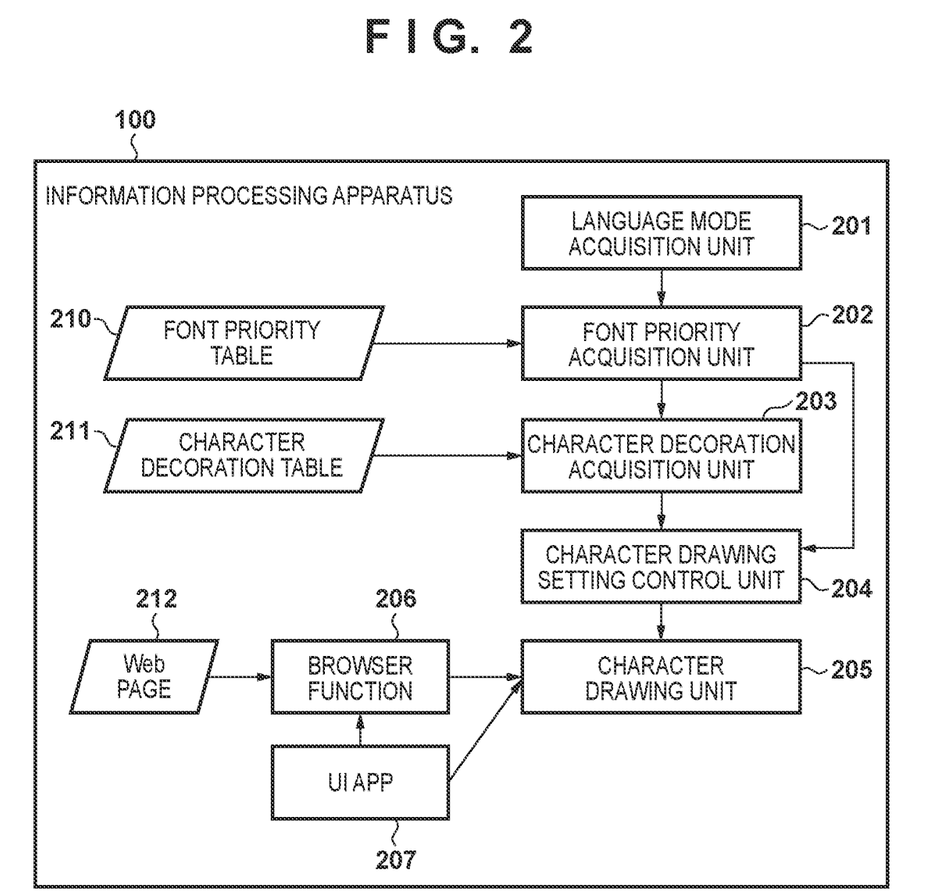
FIG. 2 is a block diagram illustrating a functional configuration example of the information processing apparatus according to the first embodiment.

FIG. 2 is a block diagram illustrating a functional configuration example related to character drawing of the information processing apparatus 100 according to the present embodiment. A language mode acquisition unit 201 acquires a language mode used by the information processing apparatus 100. Both the application and the browser function operate with reference to the language mode acquired by the language mode acquisition unit 201. A font priority acquisition unit 202 acquires a font priority corresponding to the language mode acquired by the language mode acquisition unit 201 from a font priority table 210 (described later with reference to FIG. 5A). The font priority table 210 stores a list of font priorities for each language mode. The character decoration acquisition unit 203 acquires a setting value of character decoration for each combination of a language mode and a font from a character decoration table 211 (described later with reference to FIG. 5B). The character decoration table 211 stores, for each combination of a language mode and a font file, a setting value of character decoration used by the UI application 207, described later, to draw an operation screen. In the present embodiment, the character spacing, the character width, and the character size are used as items of the character decoration to be adjusted, but the items are not limited thereto. For example, other items such as the baseline may be included in the adjustment target, or at least one of the character spacing, the character width, the character size, and the baseline may be the adjustment target. A character drawing setting control unit 204 applies the font priority and the setting value of the character decoration to the character drawing of the browser.

A Web page 212 is data for providing a browser region that is a part of the UI screen provided by the UI application. The browser function 206 interprets the Web page 212 and draws a browser region in cooperation with the character drawing unit 205. The UI application 207 generates a UI screen including a browser region and an application region. As described above, the browser region is drawn using the browser function 206. The Web page 212 may be data transmitted from an external server or data stored in the information processing apparatus 100. In addition, the UI application 207 draws an application region of the UI screen in cooperation with the character drawing unit 205. The character drawing unit 205 draws characters according to the value set by the character drawing setting control unit 204. In this manner, the browser function 206 and the character drawing unit 205 provide a first drawing function of drawing a Web page, and the UI application 207 and the character drawing unit 205 provide a second drawing function different from the first drawing function.

Here, a home screen including a browser region and an application region generated by the UI application 207 will be considered. The home screen is a screen that the user first sees when the apparatus is activated. On the home screen, a login button, a device setting button, a region in which an icon for selecting a function is arranged, and the like are displayed. On the home screen, various buttons are configured by a UI application, and icons for selecting functions are arranged in the browser region. In this case, if the character decoration of the icon and the characters drawn around the icon is different from the character decoration of the various buttons and the characters drawn around the various buttons, it causes degradation in designability of the home screen and degradation in visibility.

Figure 4A:
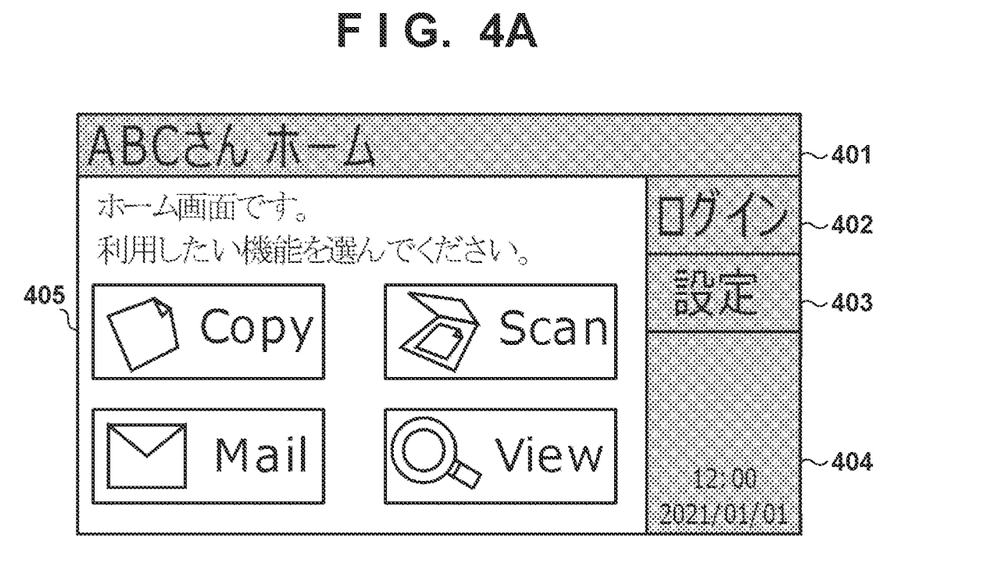
FIG. 4A is a diagram illustrating a general drawing example of a home screen including a browser region.
Figure 4B:
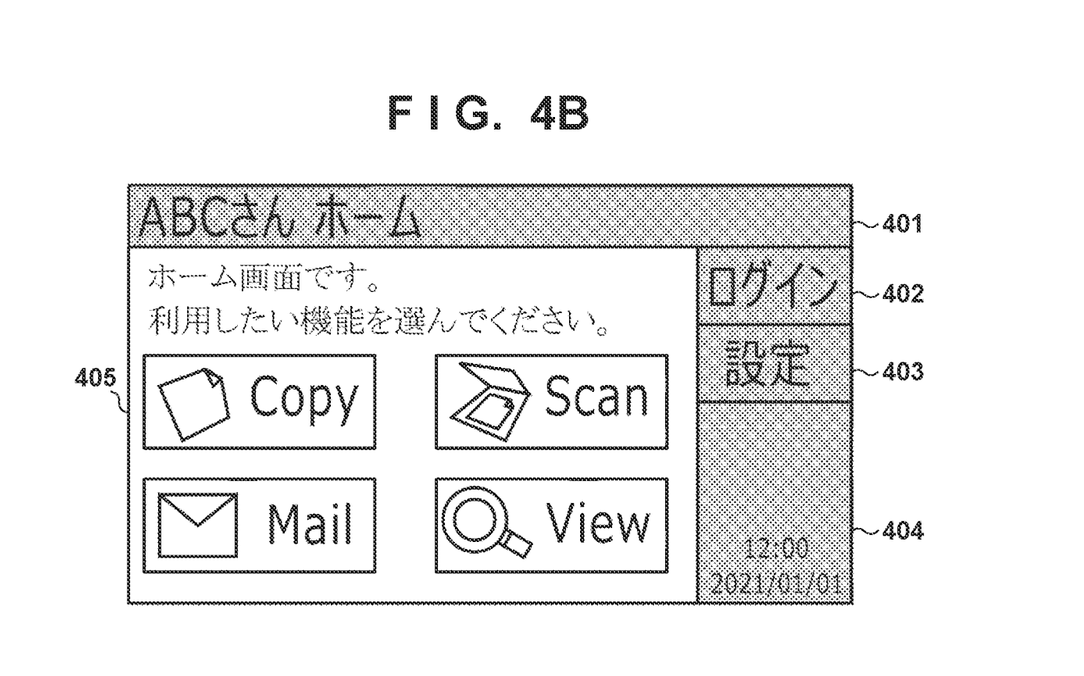
FIG. 4B is a diagram illustrating a drawing example of the home screen including the browser region according to the present embodiment.

A general drawing example of a home screen including a browser region and an application region is shown in FIG. 4A, and a drawing example of the home screen according to the present embodiment is shown in FIG. 4B. As described above, the application region is a region drawn by the UI application 207 (second drawing function), and the browser region is a region drawn by the browser function 206 (first drawing function). In FIGS. 4A and 4B, a portion with a shaded background is the application region, and a portion with a white background is the browser region. A login name and current screen information are displayed in a region 401, a login button is arranged in a region 402, a setting button is arranged in a region 403, and a current status is displayed in a region 404. These regions 401 to 404 constitute an application region. On the other hand, components for selecting a function provided on the screen being displayed are arranged in the browser region 405. This example is a home screen, and options selectable by the user are displayed as icons in the browser region 405.

Here, it is assumed that the font file A and the font file B are used for the characters of the home screen in the present embodiment. It is assumed that font file A includes only full-width Japanese characters, and font file B includes half-width ASCII characters and full-width Japanese characters. On the home screen of FIG. 4A, in the application region (regions 401 to 404), the font priority of the font file B is the first priority and the font priority of the font file A is the second priority in the adjustment for the UI. Since all the shape information of the characters displayed in the region 401 to 404 of FIG. 4A is included in the font file B, all the characters are drawn using the font of the font file B. For the character spacing of the characters displayed in the regions 401 to 404, a spacing obtained by adding 3 px to a normal character spacing is used as adjustment for the UI. Furthermore, a long body is designated as the character width, and the expansion/contraction ratio in the horizontal direction is 80% of the initial value. Furthermore, as the character size, a size larger by 4 px than the initial value is designated. These adjustments are not applied to the browser region 405.

On the other hand, in the browser function 206 for drawing the browser region 405 in FIG. 4A, the font priority of the font file A is the first priority and the font priority of the font file B is the second priority in the adjustment for the browser. Since all the character shape information of the Japanese character string 406 in the browser region of FIG. 4A are included in the font file A, all the characters adopt the character shape of the font file A. In addition, "Copy", "Scan", "Mail", and "View" displayed in the icon in the browser region 405 in FIG. 4A are half-width ASCII characters. Therefore, the font file B is adopted as the characters in these icons, and the character shape information (font) is the same as the character shape information adopted in the regions 401 to 404. However, the character decorations applied to the regions 401 to 403 are not applied to these characters. Therefore, it can be seen that the appearance is not unified between the half-width ASCII characters displayed in the icon in the browser region 405 and the half-width ASCII characters "ABC" displayed in the region 401.

Figure 3:
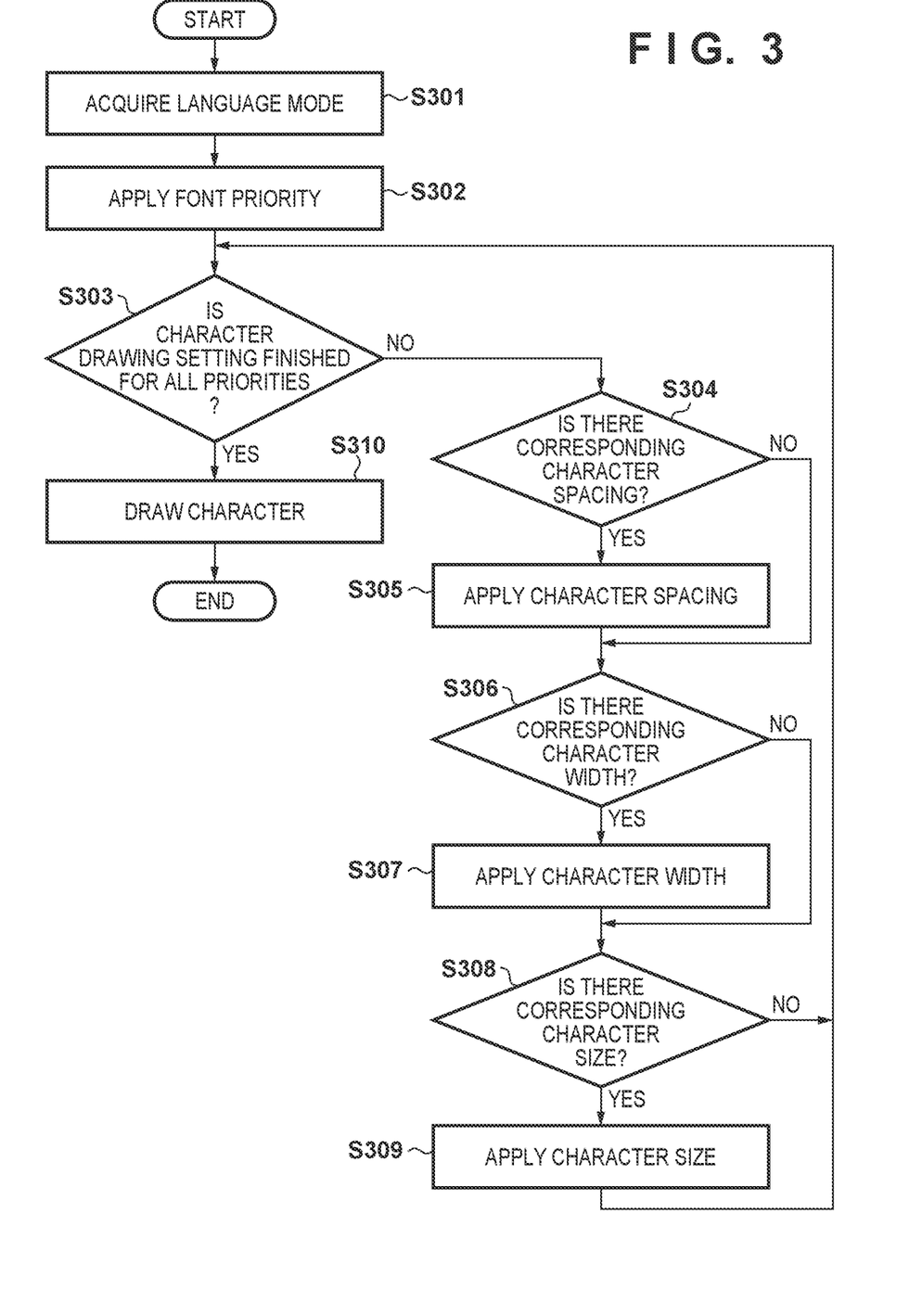
FIG. 3 is a flowchart illustrating a character drawing setting process according to the first embodiment.

FIG. 3 is a flowchart illustrating a character drawing process according to the present embodiment. For example, the home screen of FIG. 4A is drawn as illustrated in FIG. 4B by the character drawing process illustrated in FIG. 3. In the character drawing process, first, the language mode acquisition unit 201 acquires a language mode selected by the information processing apparatus 100 from among a plurality of language modes (S301). In the present embodiment, it is assumed that the information processing apparatus 100 has two types of language modes, Japanese and English, and Japanese is selected. Therefore, the following process will be described assuming that the language mode acquisition unit 201 acquires Japanese in S301. The language mode is selected by the user using, for example, a predetermined UI.

Figure 5A:
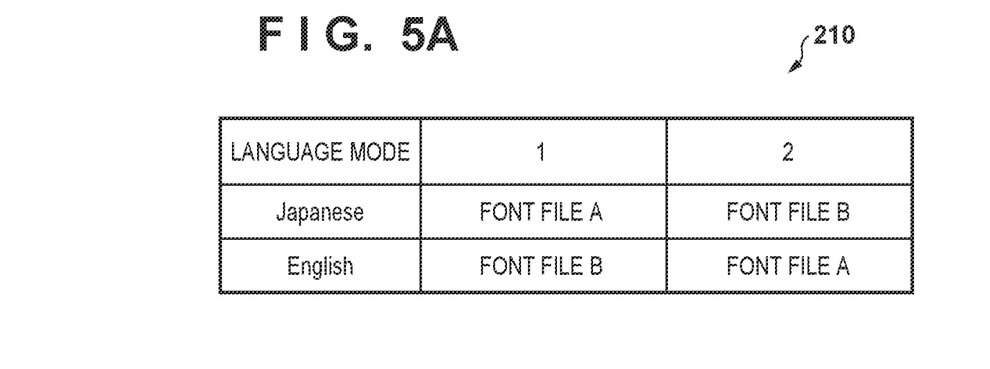
FIG. 5A is a diagram illustrating an example of a font priority table.

The font priority acquisition unit 202 acquires the font priority corresponding to the language mode acquired in S301 in the font priority table 210, and the character drawing setting control unit 204 applies the acquired font priority to the character drawing unit 205 (S302). An example of data configuration of the font priority table 210 is shown in FIG. 5A. In the font priority table 210 of FIG. 5A, when the language mode is Japanese, the font file A is specified as the first priority font and the font file B is specified as the second priority font. When the language mode is English, the font file B is specified as the first priority font, and font file A is specified as the second priority font. In the present embodiment, at least one font priority is assigned to each language mode. Note that, in a case where the font priority is not assigned to the acquired language mode, the first priority font and the second priority font may be set by referring to the initial value of the font priority held by the information processing apparatus 100. In addition, the priority of the font is not limited to two of the first and second priority fonts, and the third and subsequent priority fonts may be further set.

Next, the character drawing setting control unit 204 determines whether or not character drawing setting has been performed for all the priority fonts acquired by the font priority acquisition unit 202 (S303). When it is determined that a priority font that is not a processing target of the character drawing setting remains (NO in S303), the process proceeds to S304, and the character drawing setting is performed for the target priority font. On the other hand, if it is determined that the character drawing setting has been performed for all the priority fonts (YES in S303), the character drawing unit 205 draws a character in accordance with the set font priority and character decoration (S310). In the present embodiment, since two types of priority fonts (font files A and B) are obtained for the language mode Japanese, the character drawing setting control unit 204 executes the character drawing setting (S304 to S309) twice. When the character drawing setting is performed a plurality of times, the character drawing setting control unit 204 changes the processing target to a priority font having the next highest priority to the priority font currently being processed.

Next, the character drawing setting processes of S304 to S309 will be described. The character decoration acquisition unit 203 determines whether the character spacing corresponding to the combination of the language mode acquired in S301 and the font file to be processed is stored in the character decoration table 211 (FIG. 5B) (S304). When it is determined that the character spacing corresponding to the combination is stored in the character decoration table 211 (YES in S304), the character drawing setting control unit 204 acquires the character spacing from the character decoration table 211 and sets the character spacing in the character drawing unit 205 (S305). On the other hand, when it is determined that the corresponding character spacing is not stored in the character decoration table 211 (YES in S304), the process skips S305 and proceeds to S306. According to the character decoration table 211 in FIG. 5B, when the language mode is Japanese and the character is drawn using the character shape information of the font file A, the character spacing is 0 px. This indicates that the character is drawn at a predetermined character spacing. On the other hand, when the language mode is Japanese and the character is drawn using the character shape information of the font file B, the character spacing is 3 px. This indicates that the character is drawn at a spacing obtained by adding a 3 px to a predetermined character spacing.

Next, the character decoration acquisition unit 203 determines whether the character width corresponding to the combination of the language mode acquired in S301 and the font file to be processed in S303 is stored in the character decoration table 211 (S306). When it is determined that the character width corresponding to the combination is stored (YES in S306), the character drawing setting control unit 204 acquires the corresponding character width from the character decoration table 211 and sets them in the character drawing unit 205 (S307). On the other hand, when it is determined that the character width corresponding to the combination is not stored (NO in S306), the process skips S307 and proceeds to S308. According to the character decoration table 211 of the present example, when the language mode is Japanese and the character is drawn using the character shape information of the font file A, the character width is 1 time. This indicates that the character is drawn with a predetermined character width. On the other hand, when a character is drawn using the character shape information of the font file B, the character width is 0.8 times. This indicates that the character is drawn with a character width of 80% of the predetermined character width.

Subsequently, the character decoration acquisition unit 203 determines whether the character size corresponding to the combination of the language mode acquired in S301 and the font file to be processed in S303 is stored in the character decoration table 211 in the character decoration table 211 (S308). When it is determined that the character size corresponding to the combination is stored (YES in S308), the character drawing setting control unit 204 acquires the corresponding character size from the character decoration table 211 and sets the character size in the character drawing unit 205 (S309). On the other hand, when it is determined that the character size corresponding to the combination is not stored (NO in S308), the process skips S309 and returns to S303. According to the character decoration table 211 in FIG. 5B, when the language mode is Japanese and the character is drawn using the character shape information of the font file A, the character size adjustment is 0 px. This indicates that a character is drawn in a predetermined character size. On the other hand, when the language mode is Japanese and the character is drawn using the character shape information of the font file B, the character size adjustment is +4 px. This indicates that a character is drawn in a character size 4 px larger than a predetermined character size.

According to the processes of S303 to S309 described above, the setting value of the character decoration acquired from the character decoration table 211 according to the combination of the language mode and the font file is set in the character drawing unit 205. The set character decoration is applied to the drawing of characters using the browser function 206. The character decoration table 211 holds character decorations used by the UI application 207 for each language mode and each font file. Therefore, the character decoration can be matched between the browser function 206 and the UI application 207.

For example, the character drawing setting control unit 204 sets the character spacing 3 px, the character width 0.8 times, and the character size +4 px in the character drawing unit 205 as character decorations for when a character of the font file B is drawn. With this process, a home screen drawn as illustrated in FIG. 4A is obtained through a general method, but a home screen drawn as illustrated in FIG. 4B is obtained. That is, in FIG. 4B, the same character decorations as those in the regions 401 to 403 are applied to the characters "Copy", "Scan", "Mail", and "View" drawn using the font file B in the icon of the browser region 405. As a result, the appearance can be unified between the application region (regions 401 to 404) and the browser region 405 in FIG. 4B. In this way, a sense of unity is provided between the drawing result of the UI application 207 and the drawing result of the browser function 206.

Second Embodiment

In the first embodiment, the configuration in which the drawing setting process (S301 to S309) is performed unconditionally has been described. In the second embodiment, a configuration will be described in which the character drawing setting process (S301 to S309) is executed when the setting values of the character decoration in the application region and the setting values of the character decoration in the browser region are different from each other and are displayed on the same screen. The hardware configuration and the functional configuration of the information processing apparatus 100 of the second embodiment are similar to those of the first embodiment (FIGS. 1, 2).

Figure 6:
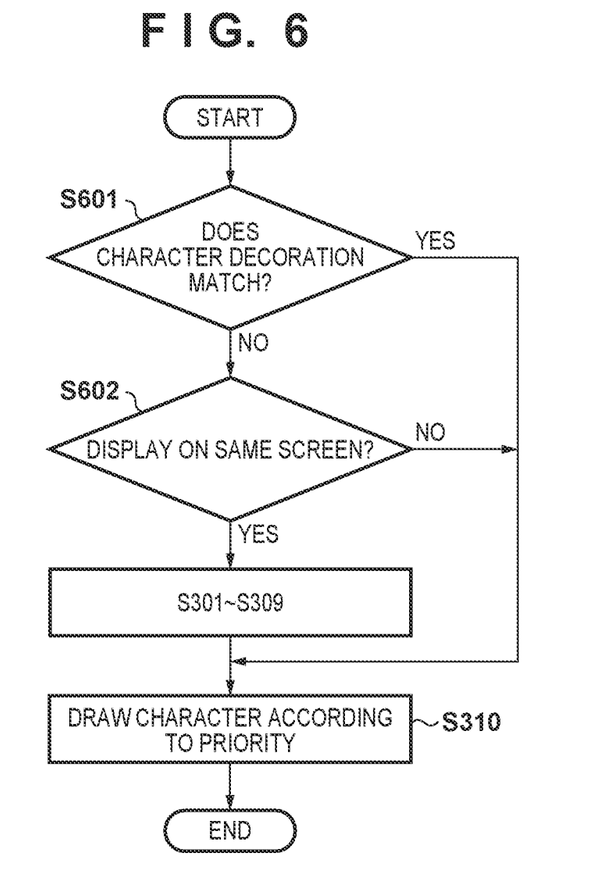
FIG. 6 is a flowchart illustrating a character drawing setting process according to a second embodiment.

FIG. 6 is a flowchart illustrating a character drawing setting process according to a second embodiment. In FIG. 6, since the processes of S301 to S310 are the same as those of the first embodiment (FIG. 3), they are shown in one box. The character drawing setting control unit 204 determines whether or not the character decorations match in the application region and the browser region constituting the UI screen (S601). Whether the character decorations match or not can be determined by, for example, comparing the character decorations held in the character decoration table 211 with the character decorations used by the browser function 206. Note that the case where the character decorations match in the application region and the browser region is a case where all items of the character decorations (in this example, the character width, the character size, and the character spacing) are the same. When it is determined that the character decorations match (YES in S601), the process proceeds to S310. On the other hand, when it is determined that at least one item of the character decoration is different (NO in S601), the process proceeds to S602. The character drawing setting control unit 204 determines whether or not the application region and the browser region are displayed in the same screen (S602). When it is determined that the application region and the browser region are not displayed in the same screen (NO in S602), the process proceeds to S310. On the other hand, when it is determined that the application region and the browser region are displayed in the same screen (YES in S602), S301 to S309 in FIG. 3 are executed.

According to the second embodiment described above, it is possible to switch the character decoration for each purpose of the application. For example, when the browser function 206 is used as a Web browser for browsing a Web page, the application region by the UI application 207 is not displayed on the screen. That is, since the application region and the browser region are not displayed in the same screen, the character decoration of the browser function 206 is applied. On the other hand, when the browser region drawn by the browser function 206 is used as a part of the UI screen generated by the UI application 207, the browser region and the application region are displayed on the same screen. In this case, the drawing setting process described in the first embodiment is executed, and the character decoration acquired from the character decoration table 211, that is, the character decoration similar to that of the UI application 207 is applied to the character drawing of the predetermined font file by the browser function 206.

Note that, in the process illustrated in FIG. 6, when the browser region and the application region are displayed on the same screen, S301 to S309 may be always executed. That is, the determination of the S601 may be omitted.

Third Embodiment

Figure 5B:
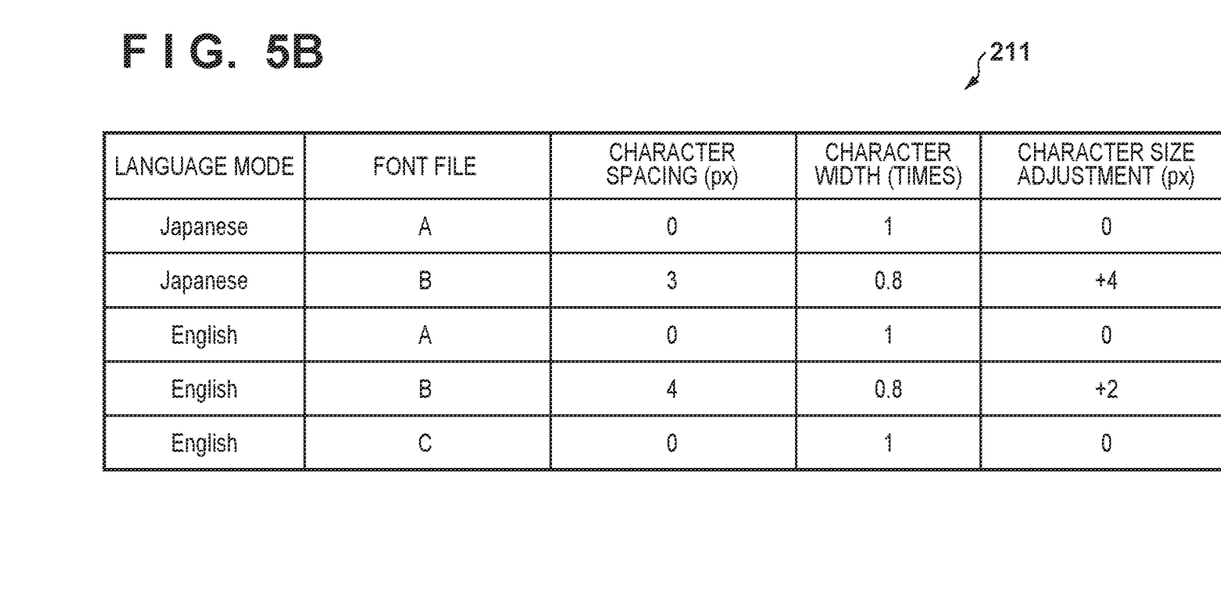
FIG. 5B is a diagram illustrating an example of a character decoration table.

In the third embodiment, the character decoration used by the UI application 207 is not stored in the information processing apparatus 100 in advance, but the UI application 207 dynamically sets the character decoration when the UI screen is generated. In a case where the setting value of the character decoration used by the UI application 207 is continued as it is from the time of product shipment, the character decorations of the application region and the browser region can be unified by holding the table as illustrated in FIGS. 5A to 5B. On the other hand, in a case where the setting value of the character decoration of the UI application 207 changes in accordance with a user instruction or cooperation with an external service, it is necessary to dynamically calculate the character decoration to be applied to the browser function 206.

Figure 7:
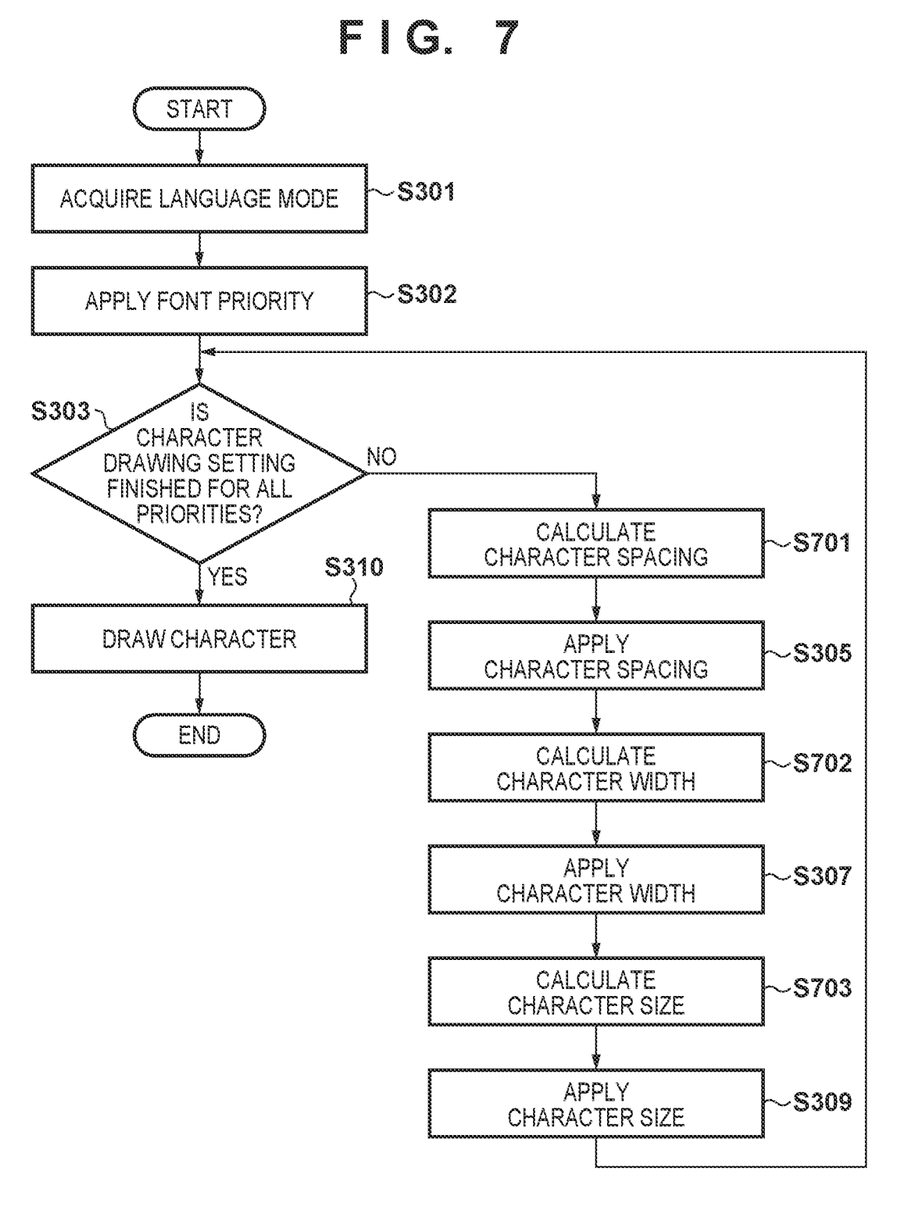
FIG. 7 is a flowchart illustrating a character drawing setting process according to a third embodiment.

FIG. 7 is a flowchart illustrating a character drawing setting process according to a third embodiment. In the process of FIG. 7, the processes of S301 to S303, S305, S307, and S309 to S310 are the processes described in the first embodiment. In S303, when it is determined that there remains a font file of a priority that is not a processing target of the character drawing setting (NO in S303), the font file to be processed is set, and then the process proceeds to S701. On the other hand, if it is determined that the character drawing setting has been performed for all the priority font files (YES in S303), the character drawing unit 205 draws a character in accordance with the set font priority and character decoration (S310).

The character drawing setting control unit 204 acquires the character spacing corresponding to the currently used combination of the language mode and the font file from the internal data table (S701). The internal data table is a table indicating character decorations currently used by the UI application 207, and is acquired by, for example, processing described below with reference to FIG. 9. The character drawing setting control unit 204 sets the character spacing acquired in S701 in the character drawing unit 205 (S305). Subsequently, the character drawing setting control unit 204 acquires the character width corresponding to the currently used combination of the language mode and the font file from the internal data table (S702), and sets the acquired character width in the character drawing unit 205 (S307). Furthermore, the character drawing setting control unit 204 acquires the character size corresponding to the currently used combination of the language mode and font file from the internal data table (S703), and sets the acquired character size in the character drawing unit 205 (S309).

Next, a method of acquiring character decorations (in this example, character spacing, character width, and character size) used by the UI application 207 will be described. It is difficult to estimate the character decoration applied to the character drawing unit 205 by the UI application 207 from the drawing result of the character. Therefore, in the present embodiment, a method in which the character drawing unit 205 outputs information on the character decoration is used as a method for dynamically acquiring the character decoration of the UI application 207. Specifically, when the UI application 207 draws a character, the character drawing unit 205 outputs internal data indicating a character decoration of when the character is drawn. The internal data is a data set including a font file, a character spacing, a character width, and a character size used by the UI application 207.

Figure 8:
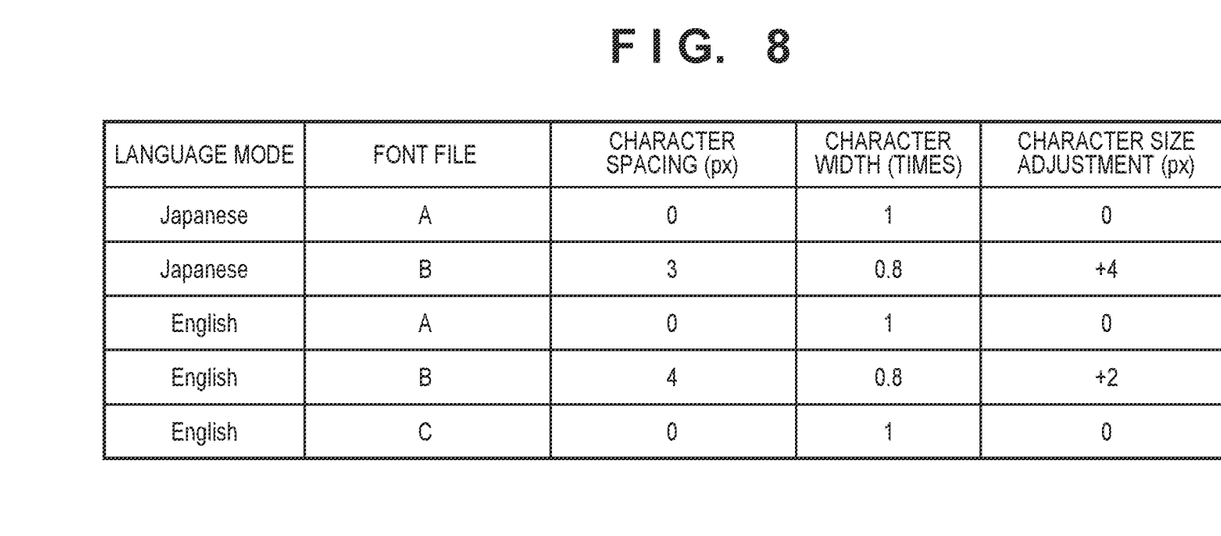
FIG. 8 is a diagram illustrating a configuration example of internal data stored in a character drawing unit according to the third embodiment.

FIG. 8 shows an example of internal data output by the character drawing unit 205. For example, when the language mode is Japanese and the font file A is used by the UI application 207, it can be seen that the character decoration has a character spacing of 0 px, a character width of 1 time, and a character size adjustment of 0 px. In addition, when the language mode is Japanese and the font file B is used by the UI application 207, it can be seen that the character decoration has a character spacing of 3 px, a character width of 0.8 times, and a character size adjustment of increase by 4 px. In the present embodiment, data information shown in FIG. 8 is stored in the storage area (RAM 103) of the information processing apparatus 100. As illustrated in FIG. 8, by holding the internal data output by the character drawing unit 205 in the storage area of the information processing apparatus 100, the browser function 206 can use the setting value of the character decoration used by the UI application 207. Note that, since the processes after S303 in FIG. 7 are performed after the internal data table is acquired, the processes Are executed after the UI application 207 finishes drawing the application region.

Figure 9:
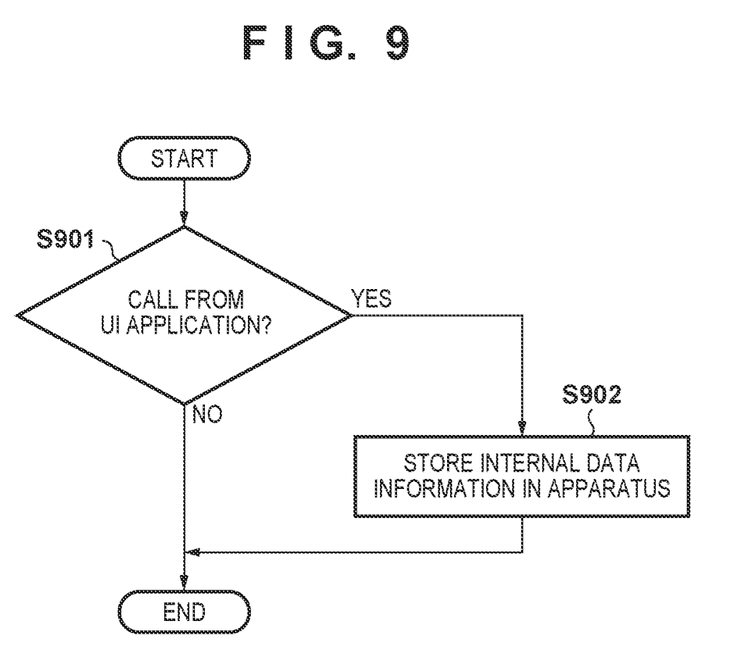
FIG. 9 is a flowchart illustrating internal data output process according to the third embodiment.

FIG. 9 is a flowchart illustrating an internal data output process by the character drawing unit 205. The character drawing unit 205 first determines whether or not the character drawing process is a call from the UI application 207 (S901). For example, in the case of character drawing to the application region, reading of the character drawing process is performed from the UI application 207. When it is determined that the caller of the character drawing process is not the UI application 207 (NO in S901), the process is ended. On the other hand, when it is determined that the caller of the character drawing process is the UI application 207 as a result of the determination in S901, the character drawing unit 205 outputs information (internal data) of the character decoration of the character drawing process (S902). The output internal data is stored in the storage area of the apparatus as an internal data table as illustrated in FIG. 8. For example, when the language mode of the information processing apparatus 100 is Japanese and the UI application 207 performs character drawing using the font file A, internal data corresponding to the first line from the top in FIG. 8 is output from the character drawing unit 205. Similarly, when the UI application 207 performs character drawing using the font file B, internal data corresponding to the second line from the top in FIG. 8 is output from the character drawing unit 205.

As described above, according to the third embodiment, even if the character decoration used by the UI application 207 changes, the character decoration at the time of the character drawing by the browser function 206 can be matched with the character decoration of the character drawing by the UI application 207. The configuration of the second embodiment may be applied to the third embodiment. In this case, in the determination in S601, matching or mismatching of the character decoration can be determined by comparing the character decoration in the internal data table with the character decoration used by the browser function 206.

As described above, according to each of the above embodiments, a sense of unity is provided in character decoration of characters drawn by different drawing functions. For example, it is possible to provide a sense of unity in character decoration between the application region provided by the UI application and the browser region provided by the browser function. Thus, character decorations in the browser region and the application region can be unified, and the expressiveness of the screen provided by the application can be improved. In each of the above embodiments, the plurality of items of the character decoration are collected in one table, but the table may be prepared for each item of the character decoration, or a group of arbitrary items may be collected and prepared for each group.

According to each of the embodiments described above, a sense of unity is provided in the character decoration of characters drawn by different drawing functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-141514, filed Sep. 6, 2022, which is hereby incorporated by reference herein in its entirety.

What is claimed is:

1. An information processing apparatus comprising:
at least one memory that stores a set of instructions; and
at least one processing circuit,
wherein the information processing apparatus is caused, by the at least one processing circuit executing the instructions and/or the at least one processing circuit itself operating, to perform operations comprising:
drawing a first screen using a first drawing function and a second screen using a second drawing function different from the first drawing function; and
acquiring a setting of a character decoration used to draw a predetermined font by the second drawing function,
wherein, in a case where the first screen is included in the second screen, the acquired setting of the character decoration is used when drawing a character of the predetermined font using the first drawing function, and
wherein the first drawing function is a browser function that draws a Web page as the first screen, and the second drawing function is a drawing function included in an application that provides the second screen.

2. The information processing apparatus according to claim 1, wherein the character decoration includes at least one of a character width, a character spacing, a character size, and a baseline.

3. The information processing apparatus according to claim 1, wherein the character decoration of the predetermined font is specified in accordance with a language mode selected from a plurality of language modes.

4. The information processing apparatus according to claim 3, wherein the character decoration of the predetermined font is set in advance for each of the plurality of language modes.

5. The information processing apparatus according to claim 1, further comprising a setting unit configured to set, as a priority font for the first drawing function, a priority font corresponding to a language mode selected from among priority fonts set in advance for a plurality of language modes.

6. The information processing apparatus according to claim 1, wherein, when character decorations used for drawing the predetermined font are different between the first drawing function and the second drawing function, a setting of the character decoration used for drawing the predetermined font by the second drawing function is acquired.

7. The information processing apparatus according to claim 1, wherein based on the first screen being included in the second screen, a setting of the character decoration used for drawing the predetermined font by the second drawing function is acquired.

8. The information processing apparatus according to claim 1, wherein a setting of a character decoration used for drawing is acquired when the second drawing function draws a character.

9. A method for controlling an information processing apparatus having a first drawing function and a second drawing function different from the first drawing function, the method comprising:
acquiring a character decoration used to draw a predetermined font by the second drawing function; and
drawing a first screen using the first drawing function and a second screen using the second drawing function,
wherein, in a case where the first screen is included in the second screen, setting of the acquired character decoration is used when drawing a character of the predetermined font using the first drawing function, and
wherein the first drawing function is a browser function that draws a Web page as the first screen, and the second drawing function is a drawing function included in an application that provides the second screen.

10. A non-transitory computer-readable storage medium storing a program for causing a computer to execute a method for controlling an information processing apparatus having a first drawing function and a second drawing function different from the first drawing function, the control method comprising:

acquiring a character decoration used to draw a predetermined font by the second drawing function; and drawing a first screen using the first drawing function and a second screen using the second drawing function, wherein, in a case where the first screen is included in the second screen, setting of the acquired character decoration is used when drawing a character of the predetermined font using the first drawing function, and wherein the first drawing function is a browser function that draws a Web page as the first screen, and the second drawing function is a drawing function included in an application that provides the second screen.

* * * * *